United States Patent
Müller

[11] 3,881,741
[45] May 6, 1975

[54] INDEPENDENT SUSPENSION OF FRONT WHEELS OF MOTOR VEHICLES

[75] Inventor: Alf Müller, Bittenfeld, Germany

[73] Assignee: Daimler-Benz Aktiengesellschaft, Stuttgart, Germany

[22] Filed: Aug. 15, 1973

[21] Appl. No.: 388,657

[30] Foreign Application Priority Data
Nov. 14, 1972  Germany............................ 2255679

[52] U.S. Cl. ........................ 280/96.2 A; 280/124 A
[51] Int. Cl. .............................................. B62d 7/20
[58] Field of Search ...... 280/96.2 R, 96.2 A, 124 R, 280/124 A; 267/20 A

[56] References Cited
UNITED STATES PATENTS
2,775,467  12/1956  Kraus et al...................... 280/124 A
3,278,196  10/1966  Van Winsen................... 280/96.2 R Primary Examiner—M. Henson Wood, Jr.
Assistant Examiner—Michael Mar
Attorney, Agent, or Firm—Craig & Antonelli

[57] ABSTRACT

An independent suspension for the front wheels of motor vehicles by means of two guide members disposed one above the other whose pivot axes intersect in the center position of the wheel, on the one hand, as viewed in side view, at a relatively large distance to the rear of the front wheel and below the wheel center and, on the other, as viewed in plan view, at a relatively large angle; the pivot axis of the upper guide member, as viewed in plan view, thereby extends rearwardly outwardly approximately diagonally while the pivot axis of the lower guide member extends either parallel to the vehicle longitudinal axis or at a small angle thereto.

32 Claims, 7 Drawing Figures

INDEPENDENT SUSPENSION OF FRONT WHEELS OF MOTOR VEHICLES

The present invention relates to an independent suspension of the front wheels of motor vehicles by means of two guide members arranged one above the other, whose pivot axes intersect in the center position of the wheel, on the one hand, as seen in side view, at a relatively large distance to the rear of the front wheel below the wheel center and, on the other, as viewed in plan view, under a relatively large angle, whereby the pivot axis of the upper guide member, as viewed in plan view, extends rearwardly outwardly. It is assured thereby that in case of an inward spring deflection of the wheels, i.e., during the spring movement normally occurring during braking, the brake pitching compensation progressively improves. It can be achieved simultaneously therewith that the changes in positive caster of the wheel are kept within narrow limits. As a result of the inclined position of the guide member the brake forces are transmitted additionally to a considerable extent as tensional forces and remain relatively small.

It is the aim of the present invention above all to further improve the absorption of the brake forces and the steering stability. Accordingly, the present invention essentially consists in that with a wheel suspension of the type described hereinabove, as viewed in plan view, the pivot axis of the lower guide member extends parallel to the vehicle longitudinal axis or at a relatively small angle with respect thereto and the pivot axis of the upper guide member extends approximately diagonally rearwardly toward the outside.

Furthermore, the point of intersection of the pivot axes of the two guide members, as viewed in side view, lies preferably within the area of the rear axle of the vehicle or also the rear of the same. The arrangement of the guide members is thereby made in particular in such a manner that, as viewed in side view, the steering axis which is defined by the joints that connect the upper and lower guide member with the wheel carrier, intersects the road surface in front of the point of contact of the wheel, therefore produces a positive caster and the caster has a minimum within the main spring range. The instantaneous center of the wheel carrier in the vehicle longitudinal direction is disposed, in the center position of the wheel, advantageously in a point disposed relatively far toward the rear whereby it approaches the wheel in a known manner during inward spring deflection of the wheel while exceeding a 100% brake pitching equalization, and moves toward the rear to infinity during outward spring deflection of the wheel and returns from infinity on the side in front of the wheel toward the latter.

The following advantages are achieved by the present invention:

1. As a result of the brake pitching-support which is progressive during inward spring deflections, i.e., as a result of a progressive increase of the brake pitching compensation with increasing brake nose-diving of the vehicle front section and as a result of the brake pitching reinforcement increasing with a stronger outward spring deflection, the wheels are returned in both cases approximately into the center position during braking. A stabilization of the vehicle, especially a decrease of the curve tilting during curve-braking, results therefrom.

2. As a result of the positive inclined spring system of the wheel which lies advantageously at about 3°, i.e., with which the wheel can therefore spring deflect inwardly in the impact direction, the rolling-off, the driving comfort and the steering unsteadiness are improved. The inherently present disadvantage that the positive inclined spring system reinforces the brake nose-diving, is compensated for by the kinematics with progressive brake-pitching-support.

3. As a result of the point of intersection of the pivot axes of the two guide members which is located relatively far toward the rear, the caster change can be kept particularly small in the center position of the wheel during spring deflections thereof in that the caster passes through a minimum value. A fluttering of the wheel and a steering unsteadiness or instability are avoided; similarly a steering system which is difficult-to-operate at full load, is also prevented thereby. The increase of the positive caster angle both in case of inward spring deflection as also in case of outward spring deflection has additionally as a consequence that when driving through a curve, a reinforced return moment acts on the steering system with increasing curve tilting.

4. As a result of the provided inclined arrangement of the guide members, one obtains the advantageous possibility to stably support the guide members rearwardly toward the vehicle body whereby the forward frame section and the forward part of the body can be effectively relieved and front-section vibrations can be avoided. The space in front of the front axle at the same time is not needed by the wheel guide system. For this purpose both the lower as also the upper guide member can be constructed fork-like with one guide arm each which is supported at the vehicle superstructure to the rear of the wheel center axis, preferably approximately in a vertical vehicle cross plane tangential to the wheel or at the location of the vehicle end wall.

Accordingly, it is an object of the present invention to provide an independent wheel suspension for the front wheels of motor vehicles which avoids the aforementioned shortcomings and drawbacks of the prior art systems by simple means.

A further object of the present invention resides in an independent wheel suspension of the front wheels of motor vehicles of the type described above which exhibits improved characteristics as to the absorption of the brake forces and the steering stability.

A further object of the present invention resides in a front wheel suspension for motor vehicles which is characterized by an improved stabilization of the vehicle, especially when braking while driving through curves.

Still another object of the present invention resides in an independent suspension for the front wheels of motor vehicles which minimizes changes in caster angle in the center position of the wheel when undergoing spring deflections.

Another object of the present invention resides in an independent wheel suspension for the front wheels of motor vehicles which permits an effective unloading of the front portion of the body without the danger of vibrations.

These and other objects, features and advantages of the present invention will become more apparent from the following description when taken in connection with the accompanying drawing which shows, for purposes of illustration only, one embodiment in accordance with the present invention, and wherein.

Figure 1:
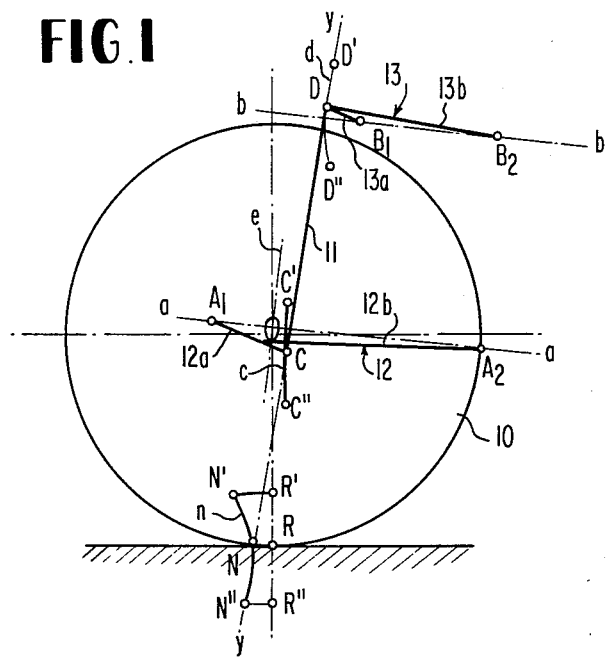
FIG. 1 is a schematic partial side view of a front wheel suspension according to the present invention, illustrating the kinematics thereof.

Referring now to the drawing wherein like reference numerals are used throughout the various views to designate like parts, and more particularly to FIGS. 1 to 4 which schematically illustrate an independent front wheel suspension in accordance with the present invention, the front wheel is designated in these figures by reference numeral 10, the wheel carrier steerably carrying the wheel 10 is designated by reference numeral 11, the lower guide member is generally designated by reference numeral 12 and the upper guide member is generally designated by reference numeral 13. Since the independent wheel suspension in accordance with the present invention are axially symmetrical for the two sides of the vehicle, the suspension of only one side is illustrated herein. The guide members 12 and 13 are constructed forked and include each a forward fork arm 12a and 13a and a rearwardly directed fork arm 12b and 13b, respectively.

The lower guide member 12 is pivotally supported at the vehicle superstructure in the points of pivotal connection $A_1$ and $A_2$ in a pivot axis $a-a$ while the upper guide member 13 is pivotally supported at the vehicle superstructure in the points of pivotal connection $B_1$ and $B_2$ in the pivot axis $b-b$, each by means of the fork arms thereof. The lower joint connecting the wheel carrier 11 with the lower guide member 12 is designated by reference character C while the upper joint connecting the wheel carrier 11 with the upper guide member 13 is designated by reference character D.

Figure 3:
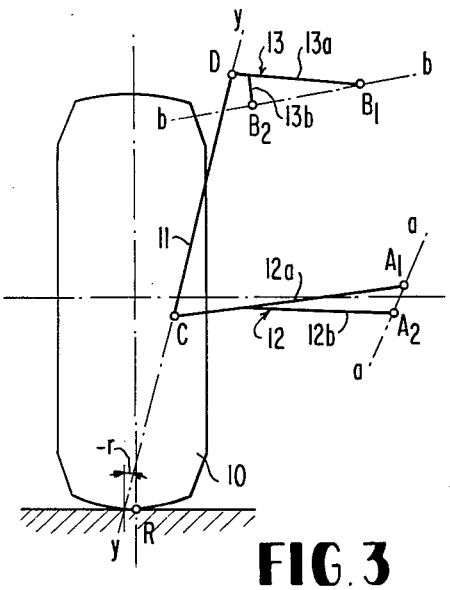
FIG. 3 is a partial schematic rear elevational view of the wheel suspension according to FIGS. 1 and 2.
Figure 2:
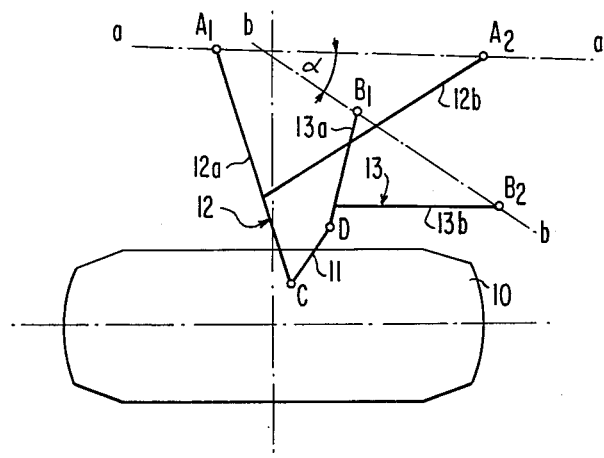
FIG. 2 is a schematic partial plan view of the wheel suspension of FIG. 1.

As can be seen from FIGS. 1 to 3, the pivot axis $a$-$a$ of the lower guide member 12 extends nearly parallel to the longitudinal axis of the vehicle but is inclined with respect to the parallel direction toward the rear slightly outwardly and slightly downwardly. The pivot axis $b-b$ of the upper guide member 13 extends, as viewed in plan view, in relation to the pivot axis $a-a$ under a relatively large angle $\alpha$ which may, for example, lie between about 25° and about 50°, and is inclined outwardly toward the rear, as viewed in plan view, and downwardly, as viewed in side view, at a slightly larger angle than the pivot axis $a-a$. Both pivot axes $a-a$ and $b-b$ intersect, as viewed in side view, at a relatively large distance from the front axle, for example, in a point which lies even to the rear of the rear axle and lower than the wheel center, as can be seen in particular from FIG. 4.

Figure 4:
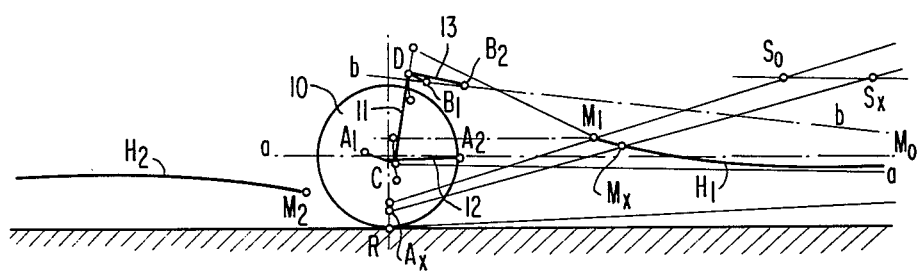
FIG. 4 is a schematic side elevational view of the wheel suspension according to FIGS. 1 to 3, at a reduced scale and indicating also the curves along which moves the instantaneous center of the wheel carrier during spring deflections of the wheel.

The essentially hyperbolic-like curves $H_1$ and $H_2$ (FIG. 4) result from this arrangement of the guide members and from the spring deflection paths $c$ and $d$ (FIG. 1) of the connecting joints C and D between an inward spring deflection point C' and D' up to an outward spring deflection point C" and D" resulting therefrom as well as from the dimensions thereof; the instantaneous center of the wheel carrier 11 moves along the curves $H_1$ and $H_2$ during spring deflections of the wheel, whereby the curves $H_1$ and $H_2$ correspond to an increasing brake pitching reinforcement. In the illustrated center position of the wheel, the instantaneous center $M_0$ is thereby determined by the point of intersection of the perpendiculars to the spring deflection paths $c$ and $d$ (FIG. 1) in the points C and D which, in the illustrated embodiment, coincides approximately with the point of intersection of the pivot axes $a-a$ and $b-b$ and which, as viewed in side view, lies to the rear of the rear wheels (outside of the drawing), as illustrated in FIG. 4. During an inward spring deflection of the wheel, the instantaneous center travels rapidly toward the front wheel along the curve $H_1$, for example, up to a point $M_1$ with maximum inward spring deflection. Already prior thereto, for example, in the point $M_x$, a 100% brake compensation is achieved, namely, when the instantaneous center exceeds the straight connecting line between the associated point of wheel contact $A_x$ and the brake center point $S_x$ of the vehicle which is disposed at the height of the center of gravity $S_o$ and regularly to the rear thereof, whereby the point $A_x$ lies above the point of wheel contact R by the amount of the associated inward spring deflection stroke in the center position of the wheel.

In the case of an outward spring deflection of the wheel, the instantaneous center moves from the point $M_o$ along the curve $H_1$ further rearwardly to infinity which is reached when the points C and D assume a position along the curves $c$ and $d$ in which the radii of curvature extend parallel, and thereupon returns along the curve $H_2$ from infinity from in front of the wheel toward the wheel, for example, up to the point $M_2$ with maximum output spring deflection.

The curve of the caster is dependent on the curves $H_1$ and $H_2$. In the center position of the wheel, the positive caster has the magnitude RN (FIG. 1), in the maximum inwardly deflected spring position of the wheel the magnitude R'N' and in the maximum outwardly deflected spring position the magnitude R"N" —corresponding to the curve $n$ illustrated in FIG. 1. As can be seen, the curve $n$ has a minimum between the values NR and N"R" within the range of the outward spring deflection stroke, and therefore extends within the area of the minimum and essentially also within the area of the center position of the wheel and thus within the main spring deflection range approximately perpendicularly to the road surface which corresponds to an only slight change of the positive caster $n$ in the main spring deflection range. The caster thereby remains positive over the entire spring stroke. Of advantage is additionally the fact that the positive caster increases toward the stroke ends which becomes effective in an increased return force above all when driving through a sharp curve.

The steering axis $y-y$, determined by the connection of the joints C and D, is slightly inclined with respect to the vertical. It passes on the inside of the center point O of the wheel (FIG. 1) and intersects the road surface, on the one hand, with a positive caster $n$ in front of the point of contact of the wheel R and, on the other, with a negative steering roll radius $-r$ (FIG. 3) on the outside of the point of wheel contact R or with a steering roll radius $= 0$. The inclined spring system of the wheel center point according to curve $e$ (FIG. 1) corresponding to the curves $c$ and $d$ of a small inclination of the spring direction with respect to the vertical, advantageously at about 3°, and with a rearwardly directed stroke components, enables a soft rolling-off of the wheel on the road surface and decreases the steering unsteadiness.

Figure 5:
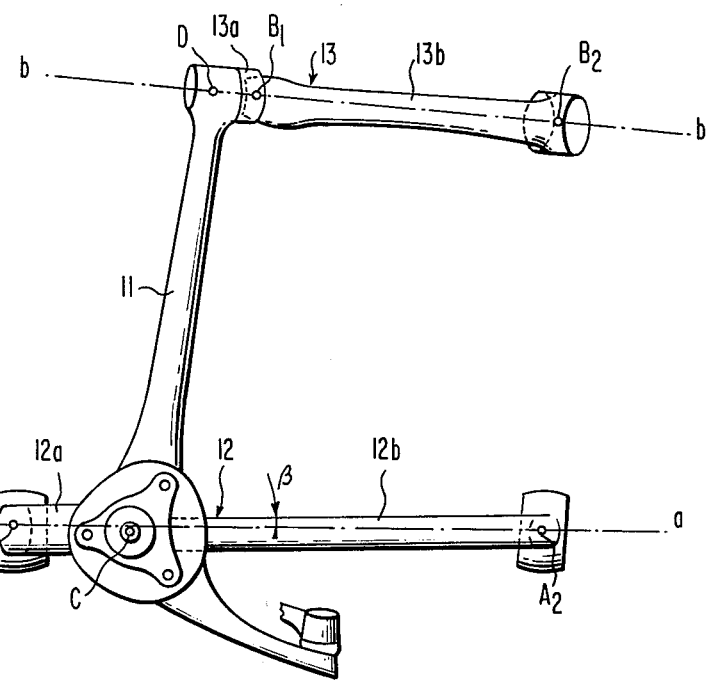
FIG. 5 is a side elevational view of a constructive embodiment of the wheel suspension in accordance with the present invention schematically illustrated in FIGS. 1 to 3.
Figure 6:
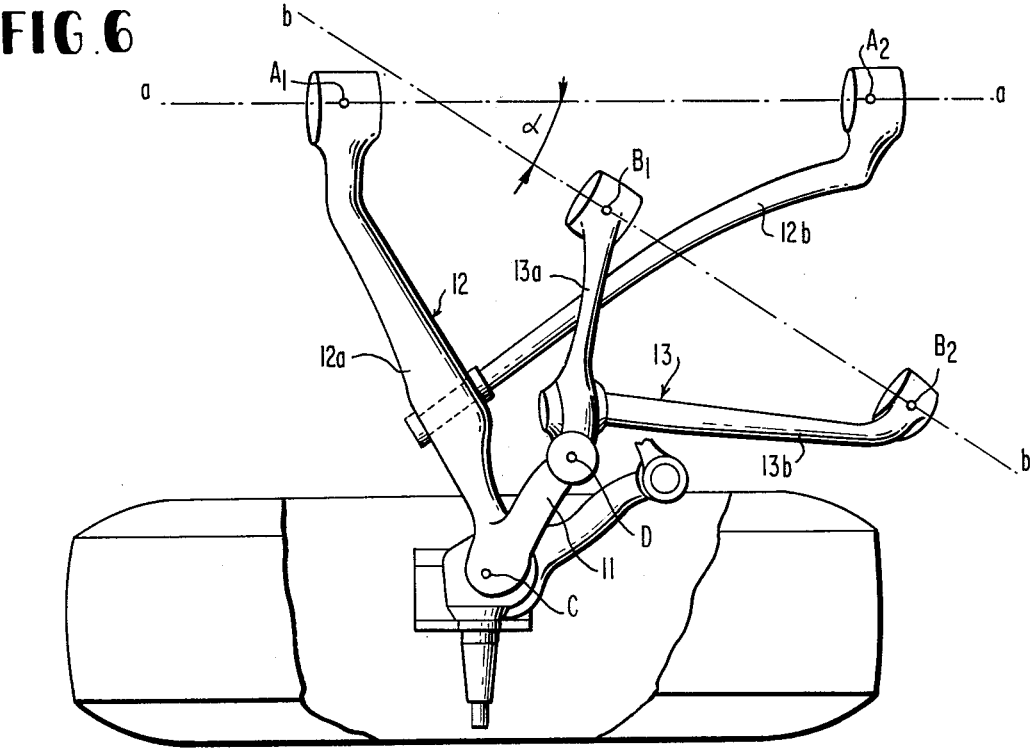
FIG. 6 is a plan view on the constructive embodiment of the wheel suspension of FIG. 5.
Figure 7:
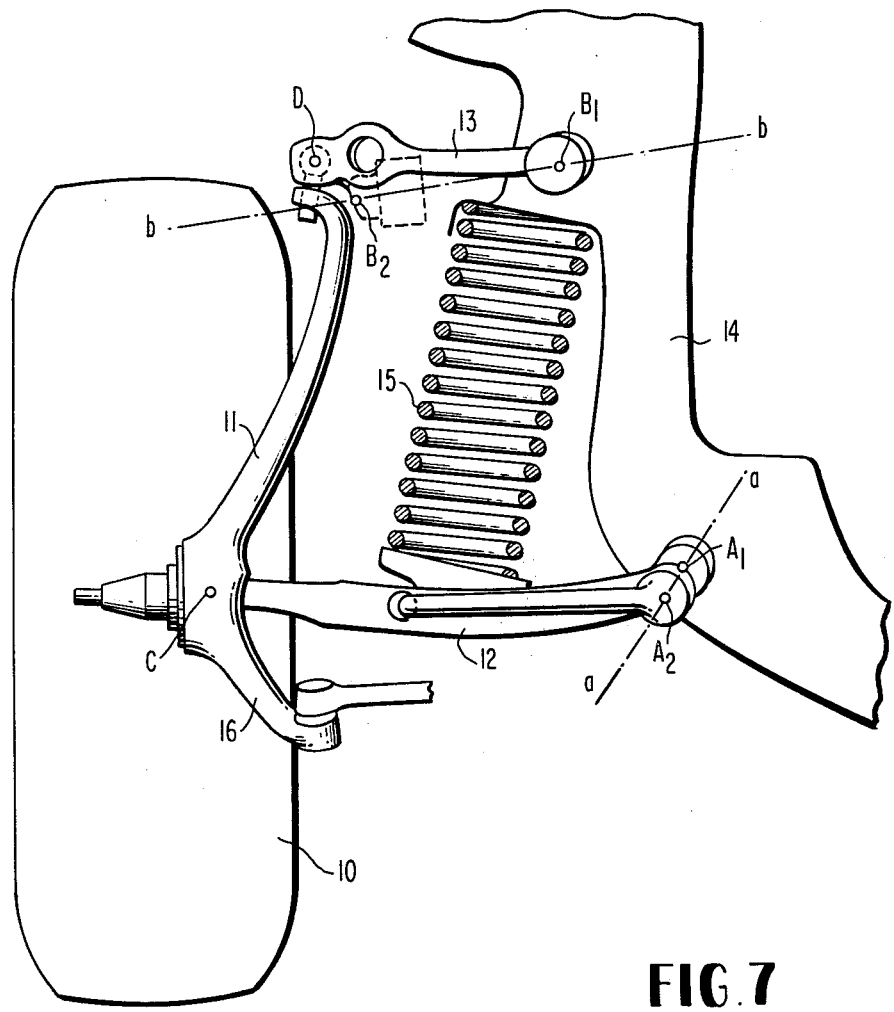
FIG. 7 is a rear elevational view of the wheel suspension according to FIGS. 5 and 6.

In the embodiment according to FIGS. 5 to 7 similar parts as in FIGS. 1 to 4 are designated by the same reference numerals and the operation of the wheel spring system illustrated in these figures corresponds to that which has been explained at length by reference to FIGS. 1 to 4. In FIG. 7 the vehicle superstructure is additionally designated by reference numeral 14, the wheel spring by reference numeral 15 and a steering lever rigidly connected with the wheel carrier 11 by reference numeral 16.

While I have shown and described only one embodiment in accordance with the present invention, it is understood that the same is not limited thereto but is susceptible of numerous changes and modifications as are known to those skilled in the art, and I therefore do not wish to be limited to the details shown and described herein but intend to cover all such changes and modifications as are encompassed by the scope of the appended claims.

What I claim is:

1. An independent wheel suspension for the front wheels of motor vehicles, comprising:
   wheel carrier means;
   two guide means arranged one above the other and with pivot axes intersecting in the center position of the wheel, on the one hand, as viewed in side view, at a relatively large distance to the rear of the front wheel below the wheel center and, on the other hand, as viewed in plan view, at a relatively large angle;
   joint means connecting the guide means with the wheel carrier means;
   a steering axis being determined by the straight line passing through the joint means;
   the pivot axis of the upper guide means, as viewed in plan view, extending rearwardly outwardly;
   the pivot axis of the lower guide means, as viewed in plan view, extending at least nearly parallel to the vehicle longitudinal axis and the pivot axis of the upper guide means extending rearwardly outwardly approximately diagonally;
   the steering axis, as viewed in side view, intersecting the road surface in front of the point of contact of the wheel, thereby defining a positive caster;
   wherein said caster has a minimum within the main spring deflection range.

2. A suspension according to claim 1, characterized in that, as viewed in side view, the point of intersection of the pivot axes of the two guide means lies at least within the area of the rear axle of the vehicle.

3. A suspension according to claim 2, characterized in that, as viewed in side view, the point of intersection of the pivot axes of the two guide means lies within the area to the rear of the rear axle of the vehicle.

4. A suspension according to claim 2, characterized by such an arrangement of the two guide means that a positive inclined-springing of the front wheels of about 3° is achieved.

5. A suspension according to claim 1, characterized by such an arrangement of the guide means that the instantaneous center of the wheel carrier means, in the center position of the wheel, is disposed in a point relatively far toward the rear, and in that the instantaneous center approaches the wheel during inward spring deflection of the wheel while exceeding a 100% brake pitching compensation and during outward spring deflection of the wheel travels toward the rear into infinity and returns from infinity on the side from in front of the wheel toward the latter.

6. A suspension according to claim 5, characterized in that, as viewed in plan view, the point of intersection of the pivot axes of the two guide means lies near the wheel center axis.

7. A suspension according to claim 6, characterized in that the pivot axis of the lower guide means, as viewed in side view, extends at least near the wheel center.

8. A suspension according to claim 7, characterized in that the pivot axis of the lower guide means, as viewed in side view, extends through the wheel center.

9. A wheel suspension according to claim 7, characterized in that the pivot axis of the lower guide means, as viewed in side view, extends past the wheel center in proximity thereto.

10. A wheel suspension according to claim 7, characterized in that the pivot axis of the lower guide means, as viewed in side view, extends below the wheel center with a slight inclination toward the rear.

11. A wheel suspension according to claim 7, characterized in that, as viewed in plan view, the pivot axis of the upper guide means intersects the longitudinal wheel center plane to the rear of the wheel and near the latter.

12. A suspension according to claim 11, characterized in that, as viewed in end elevational view, the steering axis of the wheel, with an inclination to the vertical, intersects the road surface with a steering roll radius which is at most zero.

13. A wheel suspension according to claim 12, characterized in that the steering roll radius is negative.

14. A suspension according to claim 12, characterized in that both the lower as also the upper guide means is constructed fork-like with one guide arm each supported at the vehicle superstructure to the rear of the wheel center axis.

15. A suspension according to claim 14, characterized in that said guide arms are supported at the superstructure in a vertical vehicle cross plane disposed substantially tangentially to the wheel.

16. A suspension for a motor vehicle with an end wall for the passenger space according to claim 14, characterized in that said guide arms are supported at the vehicle superstructure substantially in the plane of the vehicle end wall.

17. A suspension according to claim 1, characterized by such an arrangement of the two guide means that a positive inclined-springing of the front wheels of about 3° is achieved.

18. A suspension according to claim 1, characterized in that, as viewed in plan view, the point of intersection of the pivot axes of the two guide means lies near the wheel center axis.

19. A suspension according to claim 1, characterized in that the pivot axis of the lower guide means, as viewed in side view, extends at least near the wheel center.

20. A suspension according 1, claim 1 characterized in that the pivot axis of the lower guide means, as viewed in side view, extends through the wheel center.

21. A wheel suspension according to claim 1, characterized in that the pivot axis of the lower guide means, as viewed in side view, extends past the wheel center in proximity thereto.

22. A wheel suspension according to claim 1, characterized in that the pivot axis of the lower guide means, as viewed in side view, extends below the wheel center with a slight inclination toward the rear.

23. A wheel suspension according to claim 1, characterized in that, as viewed in plan view, the pivot axis of the upper guide means intersects the longitudinal wheel center plane to the rear of the wheel and near the latter.

24. A suspension according to claim 1, characterized in that, as viewed in end elevational view, the steering axis of the wheel, with an inclination to the vertical, intersects the road surface with a steering roll radius which is at most zero.

25. A wheel suspension according to claim 24, characterized in that the steering roll radius is negative.

26. A suspension according to claim 1, characterized in that both the lower as also the upper guide means is constructed fork-like with one guide arm supported at the vehicle superstructure to the rear of the wheel center axis.

27. A suspension according to claim 26, characterized in that said guide arms are supported at the superstructure in a vertical vehicle cross plane disposed substantially tangentially to the wheel.

28. A suspension for a motor vehicle with an end wall for the passenger space according to claim 26, characterized in that said guide arms are supported at the vehicle superstructure substantially in the plane of the vehicle end wall.

29. An independent wheel suspension of the steerable front wheels of motor vehicles by means of two superimposed guide means whose pivot axes intersect, on the one hand, as viewed in side view in the center position of the wheel at a relatively large distance to the rear of the front wheel below the wheel center and, on the other, as viewed in plan view, at a relatively large angle, with such an arrangement of the guide means that, as viewed in side view, the steering axis defines a caster, characterized in that the caster has a minimum within the main range of spring deflections.

30. A suspension according to claim 29, characterized in that, as viewed in end elevational view, the steering axis of the wheel, with an inclination to the vertical, intersects the road surface with a steering roll radius which is at most zero.

31. A wheel suspension according to claim 30, characterized in that the steering roll radius is negative.

32. An independent wheel suspension for the front wheels of motor vehicles, comprising wheel carrier means, guide means arranged one above the other and connected with the wheel carrier means, a steering axis defined by the connection of the wheel carrier means with the guide means and intersecting the road surface so as to define a positive caster, and means for maintaining said caster at a minimum within the main spring deflection range.

* * * * *